United States Patent [19]

Owen

[11] Patent Number: 5,131,223
[45] Date of Patent: Jul. 21, 1992

[54] INTEGRATED BOOSTER AND SUSTAINER ENGINE FOR A MISSILE

[75] Inventor: William M. Owen, San Diego, Calif.

[73] Assignee: Sundstrand Corporation, Rockford, Ill.

[21] Appl. No.: 379,547

[22] Filed: Jul. 13, 1989

[51] Int. Cl.⁵ .................................................. F02K 3/10
[52] U.S. Cl. .................................... 60/263; 60/39.142; 60/39.823
[58] Field of Search ............... 60/224, 225, 246, 263, 60/270.1, 39.141, 39.142, 39.36, 39.823, 246

[56] References Cited

U.S. PATENT DOCUMENTS

| | | | |
|---|---|---|---|
| 2,673,445 | 3/1954 | Bruckmann | 60/225 |
| 2,679,725 | 6/1954 | Sharma | 60/263 |
| 3,046,742 | 7/1962 | Egbert | 60/246 |
| 3,117,418 | 1/1964 | McCoy et al. | |
| 3,414,217 | 12/1968 | Kesting | 60/246 |
| 3,807,169 | 4/1974 | Bradeord | 60/270.1 |
| 4,096,803 | 6/1978 | Kesting | 60/246 |
| 4,161,102 | 7/1979 | Jasas et al. | |
| 4,712,371 | 12/1987 | Weber | |

FOREIGN PATENT DOCUMENTS 0038429 3/1979 Japan .

Primary Examiner—Richard A. Bertsch
Assistant Examiner—Michael I. Kocharov
Attorney, Agent, or Firm—Wood, Phillips, Mason Recktenwald & VanSanten

[57] ABSTRACT

The weight of a start cartridge in a cruise missile (10) of the type having a booster rocket (60) for initiating flight and a thrust producing gas turbine (12) for sustaining flight may be eliminated by placing the gas outlet (62) for the rocket engine (60) in ducting (64, 82) downstream of the gas turbine engine exhaust (20) so that operation of the rocket (60) to initiate flight of the missile (10), through eduction, draws sufficient air through the engine (12) to accelerate the same to starting speed.

9 Claims, 1 Drawing Sheet

INTEGRATED BOOSTER AND SUSTAINER ENGINE FOR A MISSILE

FIELD OF THE INVENTION

This invention relates to missiles such as cruise missiles, and more particularly, to the integration of the booster and sustainer engines commonly used on such missiles.

BACKGROUND OF THE INVENTION

In commonly assigned U.S. application Ser. No. 263,397 in the name of Jones and Weber, filed Oct. 27, 1988, entitled "Sustainer Propulsion System" and assigned to the same assignee as the instant application, the details of which are herein incorporated by reference, there is disclosed a missile including a sustainer engine. The sustainer engine is a thrust producing gas turbine which is employed to sustain the flight of the missile. However, to initiate the flight of the missile, it is common to use a rocket engine to provide sufficient boost for the purpose. Typically, the rocket engine will be a solid fuel rocket engine.

To launch the missile, the rocket engine is fired and either simultaneously, or shortly thereafter, the gas turbine engine is likewise started to provide sufficient thrust to sustain the flight of the missile to its target. In the usual case, a pyrotechnic device such as a conventional start cartridge is employed to initiate operation of the gas turbine engine. Typically, the start cartridge is fired to generate gas under pressure and such gas under pressure is directed to the compressor or the turbine wheel or both to accelerate the engine rotor up to a speed where at its operation may be self-sustained, frequently 15 or 20% of rated speed. At that time fuel is admitted to the engine combustor and sustained combustion will occur to maintain operation of the engine and induce further acceleration up to rated speed. Conventionally, this requires the addition of a set of nozzles for introducing the gases from the start cartridge into the gas turbine that are in addition to the nozzle by which gases of combustion generated in the engine combustor are directed against turbine wheel.

In most any application of a gas turbine, it is desirable that the complexity of the components be minimized to reduce fabrication cost, minimize failure rates, increase the ease of servicing and the like. Where the gas turbine is employed in an airborne environment as in a cruise missile, it is further desirable that system weight be minimized so as to maximize payload, range, etc.

The present invention is directed to accomplishing those objectives.

SUMMARY OF THE INVENTION

A principal object of the invention is to provide improved vehicle system such as cruise missile. Another object of the invention is to provide an improved starting system for gas turbine engines. Still another object of the invention is to provide a method of starting a gas turbine engine and still another object of the invention is to provide a method of starting a missile such as a cruise missile.

According to one facet of the invention, there is provided a vehicle that includes a vehicle body. A gas turbine engine is within the vehicle body and includes an air inlet, a rotor and an exhaust through which gas may be expelled to provide thrust and thus propel the vehicle body. A rocket engine is also disposed within the vehicle body and includes a gas outlet for thrust producing gases to provide thrust and thus propel the vehicle body. The gas outlet is connected to the gas turbine so that operation of the rocket will windmill the rotor to accelerate the same to a self-sustaining speed whereby the rocket may be used to initiate propulsion of the vehicle while starting the gas turbine engine to sustain propulsion of the vehicle. This facet of the invention eliminates the need for a separate start cartridge and related nozzles for the gas turbine by utilizing gases from the rocket engine for the dual purpose of starting the gas turbine engine and for providing propulsion for the vehicle body.

In a preferred embodiment of the invention, the vehicle is a missile.

According to one embodiment of the invention, the gas outlet and the exhaust are connected to each other and constructed and arranged so that operation of the rocket engine will cause eduction of air through the turbine engine inlet to windmill the rotor.

According to this aspect of the invention, the vehicle may have an exhaust nozzle and one of the exhaust and the outlet is connected to the exhaust nozzle and the other of the exhaust and the outlet is disposed within the exhaust nozzle.

In a highly preferred embodiment of the invention, the gas outlet from the rocket engine is disposed within the exhaust nozzle.

The invention also contemplates the provision of a combustor for the gas turbine engine along with a flame propagation tube extending from the rocket engine to the combustor to provide a means of igniting fuel in the combustor.

According to another aspect of the invention, there is provided a gas turbine engine that includes a rotary compressor with a turbine wheel connected thereto to drive the same. An air inlet is provided for the compressor and a combustion gas exhaust from the turbine wheel is also provided. A combustor for receiving air from the compressor and fuel from a fuel source and combusting the fuel to provide gases of combustion to drive the turbine is likewise provided. An eductor is located in the exhaust and means are provided for supplying a gas under pressure to the eductor so that the gas under pressure going through the eductor will create a relatively lower pressure in the exhaust such that air will enter the gas turbine through the inlet and flow to the exhaust and accelerate the compressor and the turbine wheel so that the gas turbine can be started.

In a highly preferred embodiment of the invention, the supplying means comprises a solid fuel gas generating device.

According to this facet of the invention, the gas turbine construction is simplified since there need be no special nozzles to direct gas under pressure from a start cartridge or the like against rotating components of the gas turbine.

According to still another facet of the invention, there is provided a method of starting a gas turbine engine which comprises the steps of: a) creating a relatively lower pressure in the exhaust of the gas turbine engine to cause air to pass through the engine to accelerate the engine, b) continuing step a) until the engine reaches a predetermined speed and c) starting the engine at the predetermined speed.

In a highly preferred embodiment of the invention, step a) is performed by placing an eductor in the exhaust of the engine and delivering gas under pressure to the eductor.

According to still another aspect of the invention, there is provided a method of starting a missile of the type having a launch or booster engine for initiating flight and a gas turbine thrust engine for sustaining flight. The method comprises the steps of: a) initiating the propulsion of the missile by firing the rocket engine, b) simultaneously or thereafter utilizing at least some of the gas generated by the rocket engine to windmill the gas turbine engine and accelerate the same to a desired speed, and c) when the desired speed is achieved, starting the gas turbine engine to provide sustaining propulsion for the missile.

Other objects and advantages will become apparent from the following specification taken in connection with the accompanying drawings.

DESCRIPTION OF THE PREFERRED EMBODIMENTS

Figure 1:
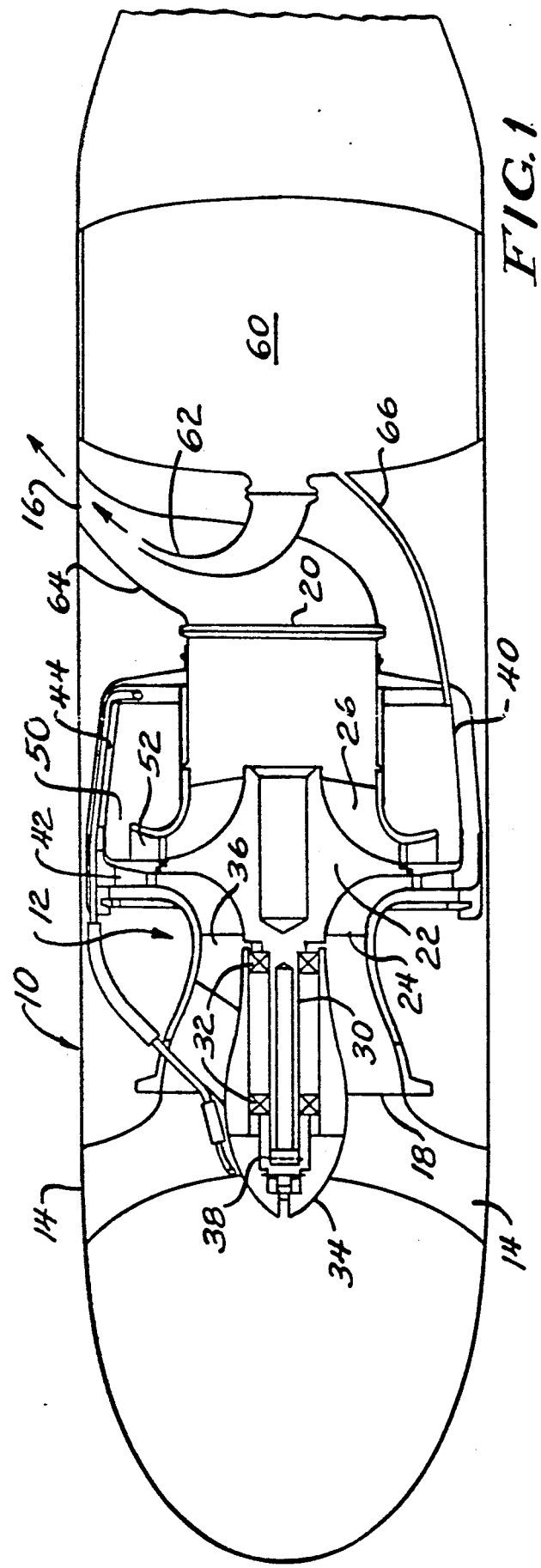
FIG. 1 is a sectional view of a missile made according to the invention.

An exemplary embodiment of a missile made according to the invention is illustrated in FIG. 1 and is seen to include a vehicle body, rather schematically illustrated at 10. Within the body is a thrust producing gas turbine engine, generally designated 12. The body 10 is provided with air intake ports 14 and at least one exhaust port or nozzle 16. For further details of the ports 14 and 16, reference may be had to the previously identified Jones et al. application.

The gas turbine engine 12 is generally along the lines disclosed in the commonly assigned application of Shekleton et al, U.S. Ser. No. 065,528, filed Jun. 22, 1987, and assigned to same assignee as the instant application, the details of which are herein incorporated by reference. For present purposes, it is sufficient to note that the same includes an air intake 18 in fluid communication with the ports 14 and an exhaust 20 in fluid communication with the port 16. The engine 12 includes a so-called monorotor 22 although other forms of rotors could be used as desired. In the illustrated monorotor configuration, the side of the rotor 22 facing the inlet 18 includes compressor blades 24 while the opposite side of the rotor 22 includes turbine blades 26 to define a turbine wheel. A forwardly extending, shaft-like extension 30 of the rotor 22 is received in bearings 32 mounted in a fairing 34 located within the intake 18 by means of struts 36. The shaft 30 may be coupled to a fuel pump 38 which provides fuel to an annular combuster 40 by means of fuel injectors (not shown).

The compressor blades 24 discharge in the radial direction to an annular diffuser 42. The compressed air is then directed to a plenum 44 about the annular combuster 40 and enters the same through well-known means to provide for the combustion of fuel within the annular combuster 40. The annular combuster 40 includes an outlet 50 to an annular turbine nozzle 52 in surrounding relation to the blades 26. The nozzle 52 directs the gases of combustion against the blades 26 so as to rotate the rotor 22 and thus the blades 24 to provide compressed air for operational purposes. Most of the energy of the gases of combustion, however, is directed out of the exhaust 20 to the port 16 to provide thrust sufficient to sustain the flight of the missile body 10.

Also disposed within the missile body 10 is a so-called booster rocket 60. Preferably, the booster rocket 60 is of the solid fuel variety and may otherwise be of a conventional construction. In the embodiment illustrated in FIG. 1, the booster rocket 60 has a gas outlet 62 located within the ducting 64 that extends from the turbine exhaust 20 to the port or nozzle 16. It will be observed that the size of the gas outlet 62 is smaller than the cross-section of the ducting 64 at the point of termination of the former so that gases may flow about the gas outlet 62 after exiting the turbine exhaust 20.

In addition, a small tube 66 extends from the rocket engine 60 to the interior of the combuster 40. The tube 66 is a flame propagation tube.

Figure 2:
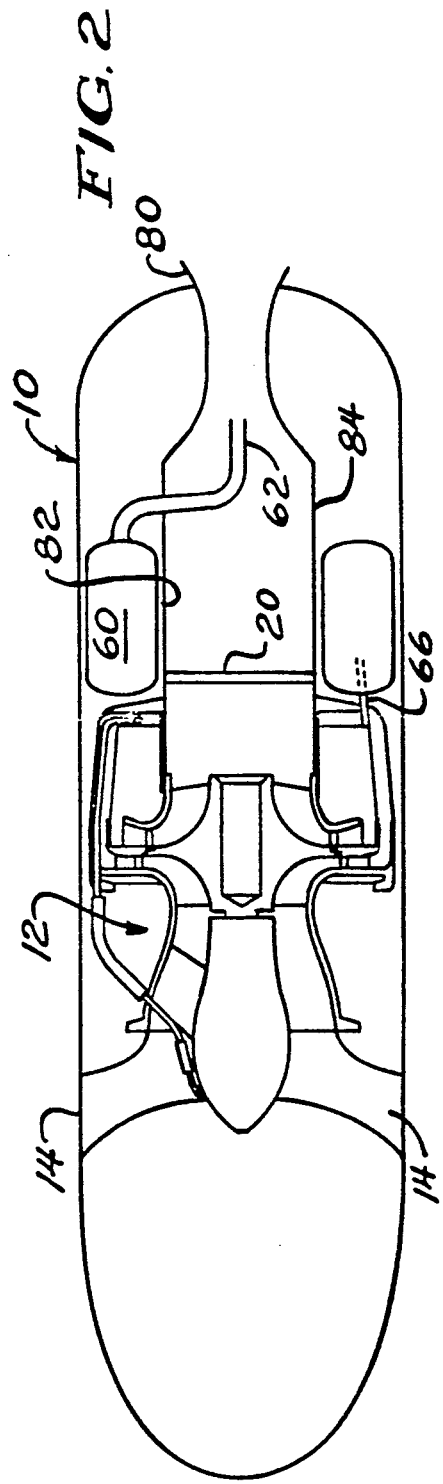
FIG. 2 is a sectional view of a modified embodiment of the missile.

A similar embodiment is illustrated in FIG. 2. Here, however, rather than use one or more ports 16 that exit from the side of the vehicle body 10, a centrally located, rearwardly extending exhaust nozzle 80 is utilized. In addition, the rocket 60 may be made with a central opening 82 to fit about exhaust ducting 84 extending from the exhaust 20 of the engine 12 to the nozzle 80. In all other respects, the two embodiments may be identical.

In operation, the missile is launched by firing the solid fuel rocket 60, and gas under pressure will pass through the gas outlet 62 toward the exhaust nozzle 16 or 80. The sizing of the gas outlet 62 with respect to the ducting 64, 84, forms an eductor within the exhaust passageway. As a consequence, a low pressure area about the gas outlet 62 will be created when gas under pressure is exiting the same.

In turn, air from the exterior of the missile body 10 will enter the ports 14 and flow through the engine 12 to the area of low pressure created by operation of the solid fuel rocket 60. This flow of air through the engine 12 will cause the rotor 22 to windmill and accelerate.

When the rotor 22 has accelerated to a self-sustaining speed, typically 15-20% of rated speed, a conventional start procedure for the engine 12 may be performed.

Of course, during the initial operation of the rocket engine 60, sufficient thrust will be produced at the exhaust nozzle 16, 80 to initiate flight of the missile body 10. Subsequent starting of the engine 12 will provide sufficient thrust to sustain such flight.

Ignition of fuel within the combuster 40 may be had without the use of a separate igniter by reason of the propagation of flame from the solid fuel rocket 60 to the combuster 40 via the flame propagation tube 66.

A number of advantages flow from the foregoing. Through the use of eduction to create the low pressure area downstream of the engine 12, no special provision for start nozzles within the engine itself need be made. That is to say, the engine may be simplified in that it requires only the nozzle 52 for directing gases of combustion from the combuster 40 against the rotor 22. The use of the flame propagation tube 66 also eliminates the need for one or more separate ignitors.

In addition, the unique use of the boost or propulsion rocket 60 as a means of causing windmilling of the rotor 22 and acceleration of the same for starting purposes allows start cartridges heretofore required for an engine such as the engine 12 to be omitted while their function retained. Again, there is a simplification and indeed, a weight reduction which permits an increase in pay load and/or range.

I claim:

1. A vehicle comprising:
   a gas turbine engine within said vehicle body including an air inlet, a rotor, and an exhaust through which gas may be expelled to provide thrust and thus propel the vehicle body, said rotor including a rotary compressor and a turbine wheel connected to the compressor to drive the same to compress air received from said air inlet, said gas turbine engine further including a combustor for receiving air from said compressor and fuel from a fuel source and combusting fuel to provide gases of combustion to drive said turbine wheel;
   and a solid fuel thrust producing engine within said body and including a gas outlet for thrust producing gases to provide thrust and thus propel said vehicle;
   said gas outlet and said exhaust being connected and constructed and arranged so that operation of said solid fuel engine will cause eduction of air through said inlet to windmill said rotor and accelerate the same to a self-sustaining speed whereby said solid fuel engine may be used to initiate propulsion of said vehicle while starting said gas turbine engine to sustain propulsion of said vehicle.

2. A vehicle comprising:
   a vehicle body;
   a gas turbine engine within said vehicle body including an air inlet, a rotor, a combustor and an exhaust through which gas may be expelled to provide thrust and thus propel the vehicle body;
   a solid fuel thrust producing engine within said body and including a gas outlet for thrust producing gases to provide thrust and thus propel said vehicle;
   said gas outlet and said exhaust being connected and constructed and arranged so that operation of said solid fuel engine will cause eduction of air through said inlet to windmill said rotor and accelerate the same to a self-sustaining speed whereby said solid fuel engine may be used to initiate propulsion of said vehicle while starting said gas turbine engine to sustain propulsion of said vehicle; and
   a flame propagation tube extending from said solid fuel engine to said combustor.

3. A gas turbine engine including:
   a rotary compressor;
   a turbine wheel connected to said compressor to drive the same;
   an air inlet for said compressor;
   a combustion gas exhaust from said turbine wheel;
   a combustor for receiving air from said compressor and fuel from a fuel source and combusting the fuel to provide gases of combustion to drive said turbine wheel;
   an eductor in said exhaust; and
   means for supplying a gas under pressure to said eductor;
   whereby gas under pressure flowing through said eductor will create a relatively lower pressure in said exhaust such that air will enter said gas turbine through said inlet and flow to said exhaust and accelerate said compressor and said turbine wheel so that the gas turbine can be started at a self-sustaining speed.

4. The gas turbine of claim 3 wherein said supplying means comprises a solid fuel gas generating device.

5. The gas turbine of claim 3 wherein said supplying means comprises a solid fuel rocket engine and said gas turbine is a thrust producing turbine.

6. A cruise missile including a missile body having a propulsion gas outlet and including the gas turbine of claim 5 mounted in said body with said exhaust and said eductor coupled to said outlet so that said rocket engine may initiate flight of said missile while accelerating said gas turbine so that said gas turbine may be started to provide sustained thrust for propelling said missile.

7. A vehicle comprising:
   a vehicle body;
   a gas turbine engine within said vehicle body including an air inlet, a rotor, and an exhaust through which gas may be expelled to provide thrust and thus propel the vehicle body, said rotor including a rotary compressor and a turbine wheel connected to the compressor to drive the same to compress air received from said air inlet, said gas turbine engine further including a combustor for receiving air from said compressor and fuel from a fuel source and combusting fuel to provide gases of combustion to drive said turbine wheel; and
   a rocket engine within said body and including a gas outlet for thrust producing gases to provide thrust and thus propel said vehicle;
   and said gas outlet and said exhaust being connected and constructed and arranged so that operation of said rocket will cause eduction of air through said inlet to windmill said rotor and accelerate the same to a self-sustaining speed whereby said rocket engine may be used to initiate propulsion of said vehicle while starting said gas turbine engine to sustain propulsion of said vehicle.

8. A missile comprising:
   a missile body;
   a gas turbine engine within said missile body including an air inlet, a rotor, and an exhaust through which gas may be expelled to provide thrust and thus propel the missile body, said rotor including a rotary compressor and a turbine wheel connected to the compressor to drive the same to compress air received from said air inlet, said gas turbine engine further including a combustor for receiving air from said compressor and fuel from a fuel source and combusting fuel to provide gases of combustion to drive said turbine wheel; and
   a rocket engine within said missile body and including a gas outlet for thrust producing gases to provide thrust and thus propel said missile;
   said gas outlet further being connected to said gas turbine so that operation of said rocket engine will windmill said rotor and accelerate the same to a self-sustaining speed whereby said rocket engine may be used to initiate propulsion of said missile while starting said gas turbine engine to sustain propulsion of said missile.

9. The missile of claim 8 wherein said rocket is a solid fuel rocket and said gas outlet is in said exhaust and operable to educt air through said gas turbine to windmill the rotor.

* * * * *